(12) United States Patent
Marzban et al.

(10) Patent No.: US 10,726,599 B2
(45) Date of Patent: Jul. 28, 2020

(54) REALISTIC AUGMENTATION OF IMAGES AND VIDEOS WITH GRAPHICS

(71) Applicant: Adobe Inc., San Jose, CA (US)

(72) Inventors: Shabbir Marzban, Quetta (PK); Brunno Fidel Maciel Attorre, New York, NY (US); Nicolas Huynh Thien, San Ramon, CA (US)

(73) Assignee: Adobe Inc., San Jose, CA (US)

( * ) Notice: Subject to any disclaimer, the term of this patent is extended or adjusted under 35 U.S.C. 154(b) by 56 days.

(21) Appl. No.: 16/104,673

(22) Filed: Aug. 17, 2018

(65) Prior Publication Data

US 2019/0057532 A1 Feb. 21, 2019

Related U.S. Application Data

(60) Provisional application No. 62/546,586, filed on Aug. 17, 2017.

(51) Int. Cl.
| | |
|---|---|
| *G06T 11/60* | (2006.01) |
| *G06T 7/543* | (2017.01) |
| *G06T 7/536* | (2017.01) |
| *G06T 7/33* | (2017.01) |

(52) U.S. Cl.
CPC .............. *G06T 11/60* (2013.01); *G06T 7/33* (2017.01); *G06T 7/536* (2017.01); *G06T 7/543* (2017.01); *G06T 2207/10024* (2013.01); *G06T 2207/20081* (2013.01); *G06T 2207/20084* (2013.01)

(58) Field of Classification Search
CPC ................. G06T 19/006; G06T 19/20; G06T 2219/2004; G06F 3/012
See application file for complete search history.

(56) References Cited

U.S. PATENT DOCUMENTS

| | | | |
|---|---|---|---|
| 8,401,276 B1* | 3/2013 | Choe ....................... | G01C 11/06 382/154 |
| 2013/0187952 A1* | 7/2013 | Berkovich ................ | G01S 5/16 345/633 |
| 2015/0331970 A1* | 11/2015 | Jovanovic ............... | G06T 15/20 703/1 |
| 2017/0221236 A1* | 8/2017 | Dowd ................... | G06T 11/203 |

OTHER PUBLICATIONS

Dclaus, Homography, URL: www.robots.ox.ac.uk/~dclaus/cameraloc/homography.htm, 2003. (Year: 2003).*

(Continued)

*Primary Examiner* — Phuc N Doan
(74) *Attorney, Agent, or Firm* — Kilpatrick Townsend & Stockton LLP

(57) ABSTRACT

Techniques disclosed herein relate generally to augmenting images or videos with graphics. More specifically, some embodiments relate to realistically or photorealistically augmenting a target image or video frame with a source graph, such as a computer-generated graph or a real world image. In one embodiment, a planar segment of the target image is identified based on a surface normal map of the target image. The planar segment is then used to determine a focal length and a homography function for transforming the source graph.

20 Claims, 9 Drawing Sheets
(4 of 9 Drawing Sheet(s) Filed in Color)

(56) References Cited

OTHER PUBLICATIONS

David, Detecting Planar Surfaces in Outdoor Urban Environments—Computational and Information Sciences Directorate, ARL Army Research Laboratory, 2008, 20 pages. (Year: 2008).*
Birodkar, scikit-image RAG Introduction, 2014, URL: https://vcansimplify.wordpress.com/2014/07/06/scikit-image-rag-introduction/ (Year: 2014).*
Hasnat, Joint Color-Spatial-Directional clustering and Region Merging (JCSD-RM) for unsupervised RGB-D image segmentation, URL: https://arxiv.org/pdf/1509.01788.pdf, pp. 1-15 (Year: 2015).*
Workman, DEEPFOCAL: A method for direct focal length estimation, 2015 IEEE International Conference on Image Processing (ICIP) (Year: 2015).*
Achanta, Radharkrishna, et al., "SLIC Superpixels", Technical report, Jun. 2010, 15 pages.
Eigen, David, et al., "Predicting Depth, Surface Normals and Semantic Labels With a Common Multi-Scale Convolutional Architecture", In Proceedings of the IEEE International Conference on Computer Vision, 2015, 9 pages.
Gupta, Ankush, et al., "Synthetic Data for Text Localization in Natural Images", In Proceedings of the IEEE Conference on Computer Vision and Pattern Recognition, 2016 10 pages.
Silberman, Nathan, et al., "Indoor Segmentation and Support Inference From RGBD Images", In ECCV, 2012, 14 pages.
Tremeau, Alain, et al., "Regions Adjacency Graph Applied to Color Image Segmentation", IEEE Transactions on Image Processing, vol. 9, Issue 4, Apr. 2000, 19 pages.

* cited by examiner

REALISTIC AUGMENTATION OF IMAGES AND VIDEOS WITH GRAPHICS

CROSS REFERENCE TO RELATED APPLICATIONS

The present application claims the benefit of and priority to U.S. Provisional Patent Application No. 62/546,586, filed on Aug. 17, 2017, entitled "REALISTIC AUGMENTATION OF IMAGES AND VIDEOS WITH GRAPHICS," the disclosure of which is herein incorporated by reference in its entirety for all purposes.

TECHNICAL FIELD

This application relates generally to augmenting images and videos with other images, and more specifically, to realistically augmenting a target image or video with a source graph, thereby improving user experience with the augmented target image or video.

BACKGROUND

With the vast amount of development in visual technologies, capabilities of virtual reality and augmented reality systems have greatly improved. While visual technologies have improved, the placement of graphs within virtual or augmented environments (herein after "virtual environments") often lacks geometric conformity. For example, many graphs displayed within a virtual environment may not accurately conform to a plane within the virtual environment. This may result in a graph appeared "pasted" instead of having a photorealistic appearance within the virtual environment. As such, the user experience with the virtual environment may be adversely impacted due to the unrealistic appearance of the augmented images.

Some current image processing systems may utilize a homography function to transform a graphic from a first view (e.g., orientation) to a second view. However, in many instances, the focal length of the camera used to record the image or video is not known. This presents a problem when applying the homography function (which may be a function of the focal length) to a graph in order to transform the graph for superimposing the graph into an image or a video frame. Some systems may use an arbitrary focal length, such as a width and/or height of the image or video frame, as the estimated focal length associated with the image or video frame. However, such an estimation often leads to non-conforming geometry of embedded graphs.

SUMMARY

Embodiments in the present disclosure relate generally to augmenting target images or videos with source images. According to certain embodiments, a computer-implemented method may include receiving a target image and identifying a planar region in the target image. The computer-implemented method may further include identifying a plurality of line segments for the planar region of the target image. The identified plurality of line segments may not be parallel. The computer-implemented method may further include determining parameters for a homography function based on an inverse function of the homography function. The inverse function of the homography function may transform at least two line segments from the plurality of line segments into two line segments in a front-parallel view. When the two line segments are in the front-parallel view, they form a predetermined angle, such as a right angle. The computer-implemented method may further include obtaining a source image in the front-parallel view, transforming the source image using the homography function, and superimposing the transformed source image onto the planar region of the target image.

In one or more embodiments, the parameters for the homography function may include a camera focal length. In one or more embodiments, determining the parameters of the homography may include setting an initial value for the camera focal length, computing the inverse function of the homography function based at least in part on the initial value for the camera focal length, and transforming the planar region of the target image using the inverse function of the homography function. The determination of the parameters of the homography may also include determining an angle between the two line segments in the transformed planar region, and determining an updated value for the camera focal length based on determining that the angle between the two line segments in the transformed planar region is different from the predetermined angle.

In one or more embodiments, determining the parameters of the homography may further include setting an initial value for the camera focal length, computing the inverse function of the homography function based at least in part on the initial value for the camera focal length, transforming the planar region of the target image using the inverse function of the homography function, and determining an angle between the two line segments in the transformed planar region. The determination of the parameters of the homography may further include determining an updated value for the camera focal length based on determining that the angle between the two line segments in the transformed planar region is different from the predetermined angle.

In one or more embodiments, the determination of the parameters for the homography function may include determining a camera focal length of the target image using a neural network trained based on training images with known camera focal lengths.

In one or more embodiments, the plurality of line segments may include intersecting line segments or line segments that intersect when extended by a distance less than a threshold distance. In one or more embodiments, the identification of the plurality of line segments for the planar region of the target image may include detecting line segments in the planar region, forming a set of line segment pairs based on the detected line segments, and removing, from the set of line segment pairs, each line segment pair in which two line segments are parallel or do not intersect when extended by the threshold distance.

In one or more embodiments, an orientation of the planar region is distinct from the front-parallel view. In one or more embodiments, identifying the planar region within the target image may include determining a surface normal map associated with the target image, and determining a plurality of superpixels associated with the target image, each superpixel including a group of pixels. The identification of the planar region within the target image may further include generating a region adjacency graph associated with the plurality of superpixel, where each superpixel is represented by a node in the region adjacency graph. The identification of the planar region within the target image may also include generating, based at least in part on the region adjacency graph, a weight value associated with each respective pair of adjacent superpixels, comparing the weight value associated with each respective pair of adjacent superpixels with a threshold weight value, and merging, for each pair of adjacent superpixels having the associated weight value lower than the threshold weight value, superpixels in the pair of adjacent superpixels to form a merged superpixel. In one or more embodiments, the determination of the plurality of superpixels may include applying simple linear iterative clustering (SLIC) on the target image.

In one or more embodiments, the weight value may indicate a similarity between each pair of adjacent superpixels. In one or more embodiments, the generation of the weight value associated with each pair of adjacent superpixels may further include determining, based at least in part on the surface normal map associated with the target image, an average normal direction for each superpixel of the pair of adjacent superpixels, and generating the weight value based at least in part on the average normal direction for each superpixel of the pair of adjacent superpixels. In one or more embodiments, the generation of the weight value associated with each pair of adjacent super pixels may further include determining, based on color values of the group of pixels in each superpixel, an average color value for each superpixel of the pair of adjacent superpixels, and generating the weight value based at least in part on the average color value for each superpixel of the pair of adjacent superpixels.

In one or more embodiments, the computer-implemented method may further include generating a weight value associated with each respective pair of adjacent merged superpixels, comparing the weight value associated with each respective pair of adjacent merged superpixels with the threshold weight value, and merging, for each pair of adjacent merged superpixels having the associated weight value lower than the threshold weight value, merged superpixels in the pair of adjacent merged superpixels to form a new merged superpixel.

In one or more embodiments, obtaining the source image in the front-parallel view may include receiving an original source image in a view different from the front-parallel view, and applying a second inverse homography function on the original source image to transform the original source image into the source image in the front-parallel view.

According to certain embodiments, a system may include a processing device and a non-transitory computer-readable medium communicatively coupled to the processing device. The processing device is configured to execute program code stored in the non-transitory computer-readable medium and thereby perform certain operations. The operations may include receiving a target image, identifying a planar region in the target image, and identifying a plurality of line segments for the planar region of the target image. The identified plurality of line segments may not be parallel. The operations may further include determining parameters for a homography function based on an inverse function of the homography function. The inverse function of the homography function may transform at least two line segments from the plurality of line segments into two line segments in a front-parallel view. When the two line segments are in the front-parallel view, they form a predetermined angle. The operations may further include obtaining a source image in the front-parallel view, transforming the source image using the homography function, and superimposing the transformed source image onto the planar region of the target image.

According to certain embodiments, a system for augmenting images or videos may include means for receiving a target image, means for identifying a planar region in the target image, and means for identifying a plurality of line segments for the planar region of the target image, where the plurality of line segments are not parallel. The system may also include means for determining parameters for a homography function based on an inverse function of the homography function, where the inverse function of the homography function transforms at least two line segments from the plurality of line segments into two line segments in a front-parallel view, and the two line segments in the front-parallel view form a predetermined angle. The system may further include means for obtaining a source image in the front-parallel view, means for transforming the source image using the homography function, and means for superimposing the transformed source image onto the planar region of the target image.

BRIEF DESCRIPTION OF THE FIGURES

The patent or application file contains at least one drawing executed in color. Copies of this patent or patent application publication with color drawing(s) will be provided by the Office upon request and payment of the necessary fee.

Features, embodiments, and advantages of the present disclosure are better understood when the following Detailed Description is read with reference to the accompanying drawings.

DETAILED DESCRIPTION

Figure 1:
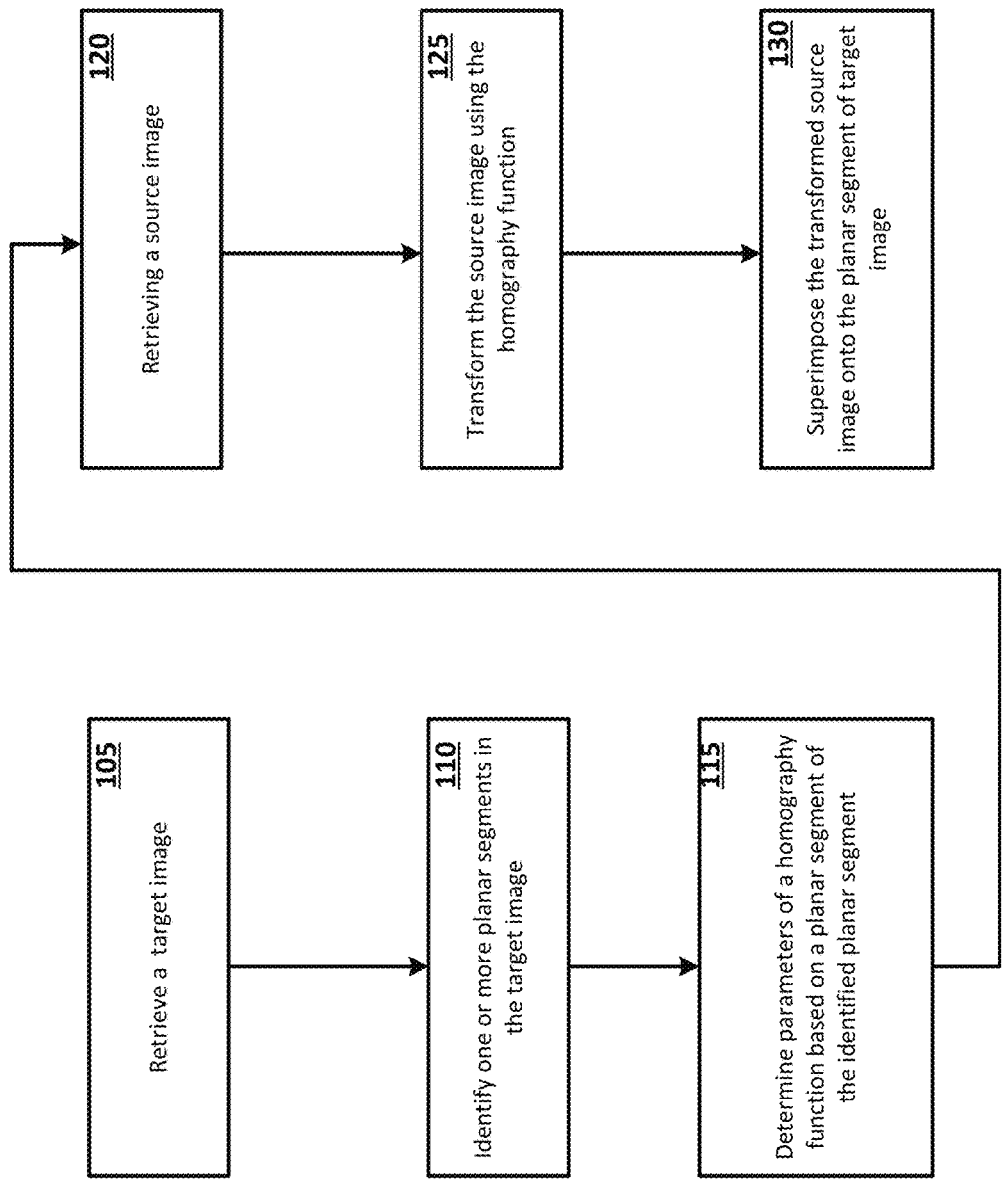
FIG. 1 illustrates an example of a process for automatic and photorealistic augmentation of images or videos with graphics according to one or more embodies disclosed herein.

Techniques disclosed herein relate generally to augmenting images or videos with graphics. More specifically, some embodiments relate to realistically or photorealistically augmenting a target image or video frame with a source graph, such as a computer-generated graph or a real world image, in systems such as virtual reality systems, augmented reality systems, mixed reality systems, or other artificial reality systems. Various embodiments are described herein, including methods, systems, non-transitory computer-readable storage media storing programs, code, or instructions executable by one or more processors, and the like.

One challenge in producing realistic augmentation of the target image or video frame is determining planes within the target image or video frame for superimposing the source graph because many images may include a plurality of different planes. In some systems, different planes within an image may be determined based on a normalized depth map of the image with an unknown scale, which often leads to inaccurate determination of planar segments in the image and thus an inability to perform accurate photorealistic augmentation.

According to some aspects of the present disclosure, techniques for accurately determining different planes within an image or an image frame of a video are disclosed. In one example, different planes within an image may be determined based on plane (e.g. surface) normals and color values of the image. A convolutional neural network (CNN) may be used to determine plane normals along with scaled depth information for each pixel within the image. Based on the average surface normal and color value of pixels in each superpixel (e.g., including a group of pixels within the image), adjacent superpixels that are similar (e.g., with a weighted difference of an average surface normal and an average color value less than a threshold value) may be merged together. The merging can be performed iteratively until no adjacent superpixels (or merged superpixels) have a weighted difference less than the threshold value. The superpixels remained after the iterative merging may represent planar segments or regions (e.g., planes) of the image.

Accurately identifying a plurality of planes within a target image alone does not achieve accurate photorealistic augmentation. Another challenge in producing realistic augmentation of a target image is determining the camera focal length used to capture the target image. The camera focal length used to capture the image and the distance at which the picture is taken is often unknown. In some systems, an arbitrary focal length, such as a focal length close to the width and height of the image, may be used as the estimated focal length. As such, the homography function (which is a function of the camera focal length) used to transform a graph for superimposing on a detected plane within the image may not be accurate, which may also lead to unrealistic augmentation of the image where the graph embedded in the image does not conform to the geometry (e.g., orientation) of the image.

According to some aspects of the present disclosure, techniques for accurately determining a camera focal length used to capture the target image are disclosed. In one embodiment, a planar segment of the target image corresponding to a merged superpixel described above may be selected as the target plane for augmentation. A plurality of line segments may be detected within the selected planar segment. The plurality of line segments may be filtered to select a set of line segments that are not close to being parallel or that can intersect along a reasonable extension of each line segment. For example, lines in a set of line segments may intersect at the end of each line and may form a "corner." After the set of line segments that meet the criteria (e.g. not close to being parallel or intersecting along reasonable extents) are determined, an inverse homography function based on an initial estimated focal length may be applied to the planar segment in an attempt to convert the planar segment to the front-parallel view. The front-parallel view is achieved if at least two of the set of line segments from the planar segment of the target image are transformed to perpendicular lines or lines forming a predetermined angle (e.g., a known angle of an object in the target image, such as a 120° angle between two edges of a "STOP" sign). The estimation of the focal length may be repeated until the inverse homography function transforms the two or more line segments from the planar segment of the target image into perpendicular lines (and thus are in the front-parallel view). In one embodiment, the focal length may be estimated or determined based on a machine learning technique, such as a neural network trained using training images with known focal lengths.

The determined focal length may then be used to calculate the homography function, which may then be applied to the source graph in the front-parallel view to transform the source graph from the front-parallel view to the orientation of the planar segment of the target image for superimposing on the planar segment of the target image. As a result, the transformed graph may better conform to the geometry of the selected area (e.g. selected planar segment) within the target image.

Because the planes or planar segments of the target image may be more accurately determined based on the surface normals and color values of the target image, and the source graph can be more accurately transformed to the orientation same as the orientation of the planar segment in the target image using a homography function determined based on an accurate focal length estimation, photorealistic augmentation of the target image or target video frame with the source graph may be achieved. As a result, user experience with the augmented target image or video frame may be improved due to the realistic appearance of the source graph in the target image or video frame.

Techniques disclosed herein can be used to merge images or adding images to video frames, for example, for virtual reality, augmented reality, or logo immersion. For example, techniques disclosed herein can be used to identify appropriate segments in images or video frames and realistically add commercial content, such as logos of advertisers or images of products with logos, to images or video frames with minimum impact on user experience.

The following examples are provided to introduce certain embodiments. In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as an "example" is not necessarily to be construed as preferred or advantageous over other embodiments or designs.

FIG. 1 illustrates an example of a process 100 for automatic and photorealistic augmentation of images or videos with graphics. At 105, a target image is retrieved. A target image may be any image that is suitable to have one or more source images embedded in it. The target image may be a picture of a room, a building, an object, nature, and the like. In one embodiment, the target image may be retrieved from an image database. The target image may be captured by a variety of camera devices such as, but not limited to, a cellular phone, digital camera, computer camera, television camera, and the like. The target image may be in one or more image formats including, but not limited to, Joint Photographic Experts Group (JPEG), Graphics Interchange Format (GIF), Portable Network Graphics (PNG), Windows Bitmap (BMP), and the like. In one embodiment, a background video may be retrieved instead of a target image.

At 110, a modified target image may be created with identified one or more planar segments. A modified target image may be a target image that details the different planes within the target image. In one embodiment, a machine learning technique (e.g. CNN methods) may be used to determine plane normals for each pixel in the target image. A Simple Linear Iterative Cluster (SLIC) algorithm may be run to group pixels into superpixels. A region adjacency graph (RAG) may be created on top of the superpixel to define weights between superpixels. According to the weight of each superpixels one or more superpixels are merged together to form merged superpixels. As a result of the merging of superpixels, the planes within the target image are now clearly identified by the presence of different merged superpixels.

At 115, parameters of a homography function are determined by implementing an inverse homography function. An inverse homography function is applied to a part of the modified target image to determine a focal length (i.e. parameters for a homography function). The inverse homography function may be applied to a plane in the modified target image. The selected plane may be a plane which a graphic will potentially be embedded within. The inversion homography function may require as input a focal length. In a first iteration, a set of line segments in the selected plane is identified and a focal length is estimated and input into the inverse homography function. The inverse homography function is then applied to the set of line segments. The resulting position of the set of line segments may be checked to determine if the set of line segments are perpendicular to each other in a front-parallel view. In one example, to determine if lines are perpendicular, when in a front-parallel view, determine the slopes of each line in the set of line segments and multiply their slopes together. If the result is −1 then the lines are perpendicular. If the set of line segments are not perpendicular to each other, then a second iteration may be performed where the focal length value is changed and the inverse homography function is applied to the set of line segments with the new focal length value. As many iterations as necessary may be repeated until a focal length value is determined that transforms the set of line segments from an orientation of the selected plane to a perpendicular line set in a front-parallel view.

In one embodiment, the focal lengths are selected, such that, when an inverse homography function is applied to a set of line segments in a first plane the set of line segments are transformed to a perpendicular line set in a front-parallel view because it may be assumed the plane exists on a man-made structure. In one embodiment, man-made structures may be assumed to be made with straight lines. As a result, if perpendicular-like line segments can be identified in a first plane (having a first orientation) of an image then an inverse homography function may be applied to transform the perpendicular-like line segments in the first plane to perpendicular lines in a front-parallel view. Most source images (i.e. graphic) are captured in a front-parallel view. Thus, if we know the inverse homography function to get perpendicular-like line segments in the first plane to perpendicular lines in a front-parallel view, then we may apply the inverse of the inverse homography function, which is the original homography function, to the front-parallel view source image to transform the source image from its front-parallel view to the orientation of the first plane. In some embodiments where the source image is not in the front-parallel view, techniques disclosed herein for determining parameters of the homograph function (e.g., the focal length and surface normal) can also be used to transform the source image into the front-parallel view. The process of applying an inverse homography function to parts of a first plane allows accurate determination of focal lengths. Once the focal lengths are determined, they can be utilized in a homography function to accurately embed a source image that conforms to the geometry of a scene portrayed in a target image. Although the focal length determination can be defined according to the assumption that the plane which a graphic will be embedded on is associated with a man-made planar structure it is possible to implement the same process on with a plane associated with any planar surface.

In one embodiment, the focal length may be determined based on a machine learning algorithm. As an input into the machine learning algorithm, there may be different views of the same structure, object, scene, and the like. For each of the plane in the structure, object, or scene, the focal length may be input. The focal length may be known at the time an image is captured or may be determined by one or more methods described in this disclosure. The machine learning algorithm, knowing the input and the desired output may begin to learn a correlation between the two. As a result of having as an input many instances of planes within structures, objects, or scenes, and the focal points associated with the instances of planes within structures, objects, or scenes, the algorithm may determine an optimized algorithm for estimating focal lengths for one or more planes in an image.

At 120, a source image is retrieved. The source image may be any text-based, image-based, or other graphic. In one embodiment, the source image may be a logo, advertisement, and the like. The source image may be any known image type, such as, but not limited to, JPEG, GIF, PNG, BMP, and the like. In one embodiment, the target image retrieved at 105 may be a different image file type than the source image. For example, the target image may be JPEG and the source image may be a GIF. The source image may be captured in a front-parallel view.

At 125, the source image is transformed using the homography function. The homography function may transform the source image from a front-parallel view to the planar structure of an identified plane in the target image. As a result of the merging of superpixels (at 110), the planes within the target image are clearly identified by the presence of different merged superpixels. In addition, the focal length for the homography function has been determined by the inverse homography function. A selection may be made to identify which of the one or more unique planes the graphic is to immersed on to. The corresponding focal length may be input into the homography function and the homography function may be applied to the graph to transform the graph from a front-parallel view to the orientation of a unique plane.

In one embodiment, a source image may span a plurality of unique planes within an image. In such an embodiment, the source image may be segmented such that each segment of the source image is associated with a unique plane within an image. For each segment of the source image, different homography functions (e.g., with different surface normals) may be applied to conform each segment of the source image to the planar structure of an associated unique plane. By implementing this technique, a graphic may realistically be embedded on multiple unique planes within an image.

At 130, the transformed source image is superimposed onto a planar segment of the target image. The planar segment of the target image may be a unique plane associated with a focal length as detailed at 125. In one embodiment, the source image embedded within the target image may be displayed by a suitable computing device, such as, a computer, a mobile phone, a smart phone, a tablet, a mobile computing device, and the like. In one embodiment, the source image embedded within the target image is displayed within a virtual environment.

Figure 2A:
FIG. 2A illustrates an example of a target image according to one or more embodies disclosed herein.

FIGS. 2A-2F illustrate a plurality of states of a target image in accordance with one or more embodiments described herein. FIG. 2A illustrates an example of a target image 200. As depicted, image 200 is an image of a cat sitting in a glass bowl inside a room.

Figure 2B:
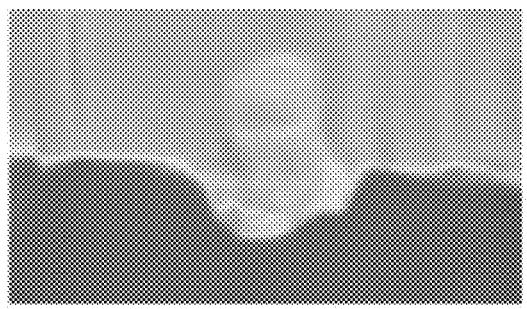
FIG. 2B illustrates an example of a normal map of a target image according to one or more embodies disclosed herein.

FIG. 2B illustrates an example of a colored normal map 210 of image 200 after applying a CNN-based method to determine a colored normal map. A colored normal map may use the colors red, green, and blue to indicate x, y, and z coordinates of a 3 dimensional (3D) image. A colored normal map may allow a 2D image to represent depth of a 3D image using color. The colored normal map may be utilized to determine normal values for each pixel in an image.

Figure 2C:
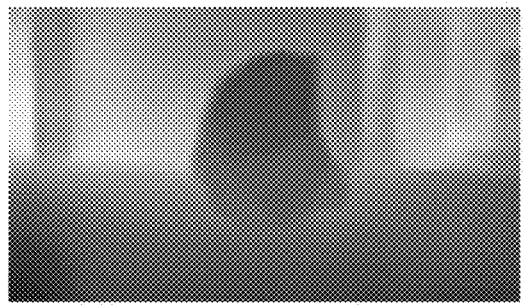
FIG. 2C illustrates an example of a depth map of a target image according to one or more embodies disclosed herein.

FIG. 2C illustrates an example of a colored depth map 220 of image 200 after applying a CNN-based method to determine a colored depth map. A colored depth map indicates different depths based on colors and shades of colors. Together, colored depth map 220 and colored normal map 210 may detail significant information about image 200.

Figure 2D:
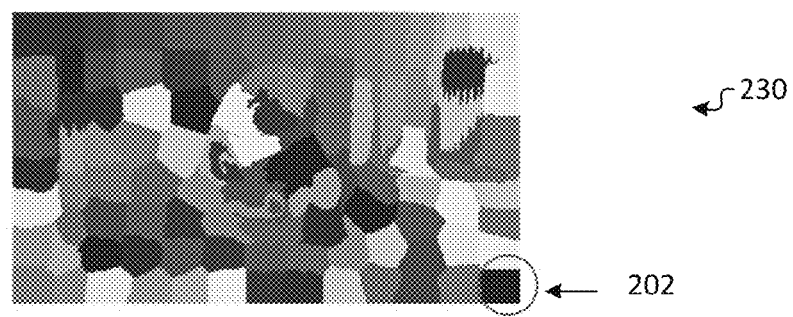
FIG. 2D illustrates an example of a superpixel image of a target image according to one or more embodies disclosed herein.

FIG. 2D illustrates a superpixel image 230 of image 200 after applying SLIC to determine a plurality of superpixels. SLIC is a method for generating superpixels by clustering pixels together based on their color similarity and proximity in the image plane. Because, in part, of the normal map as illustrated FIG. 2B and the depth map as illustrated in FIG. 2C are colored, the color in these maps may be used by SLIC to determine superpixels within image 200. Superpixel 202 is identified in FIG. 2D. Superpixel 202 is an example of one of the plurality of superpixels in FIG. 2D.

Figure 2E:
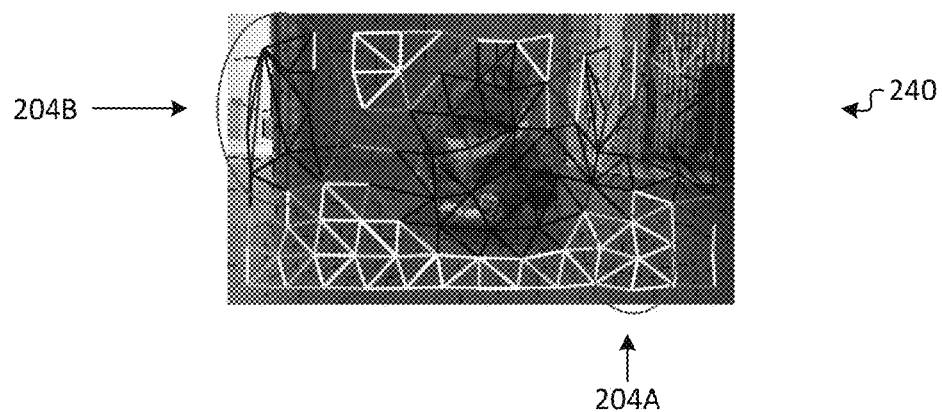
FIG. 2E illustrates an example of a region adjacency graph of a target image according to one or more embodies disclosed herein.

FIG. 2E illustrates a regional adjacent graph 240 of image 200 after applying a RAG on superpixels. After superpixels are created, similar superpixels may be identified in order form merged superpixels. A merged superpixel may comprise two or more superpixels (e.g. 2, 4, 6, 8, 10, etc.). To determine which superpixels to merge together, a RAG is created on top of the superpixels, where each node in the RAG represents a super pixel. In a RAG, brighter edges may imply higher similarity between adjacent superpixels. For example, a set of superpixels 204A contain a plurality of bright edges. These superpixels imply a higher similarity than a set of superpixels 204B which contain a plurality of darker edges.

Using the normal values indicated by the CNN-based method described in relation to FIG. 2B an average normal direction (i.e. average normal value) may be calculated for each superpixel (i.e. each node in the RAG). The average normal direction along with the color values may be used to define weights between adjacent superpixels. The weights may represent how similar the superpixels are to each other. A weight may be determined for each two adjacent superpixels. If the determined weight of two adjacent superpixels is lower than a predetermined threshold, then the two adjacent superpixels may be merged together to form a merged superpixel. This process is repeated for all adjacent superpixels/superpixels, superpixels/merged superpixels, and/or merged superpixels/merged superpixels. For example, a merged superpixel may be adjacent to a superpixel and if the weight for the two is below the threshold the merged superpixel may merge with the adjacent superpixel to form a merged superpixel. As a result, a merged superpixel may contain a plurality of superpixels. The process of merging superpixels continues until there are no adjacent superpixels or merged superpixels lower than the predetermined threshold.

Figure 2F:
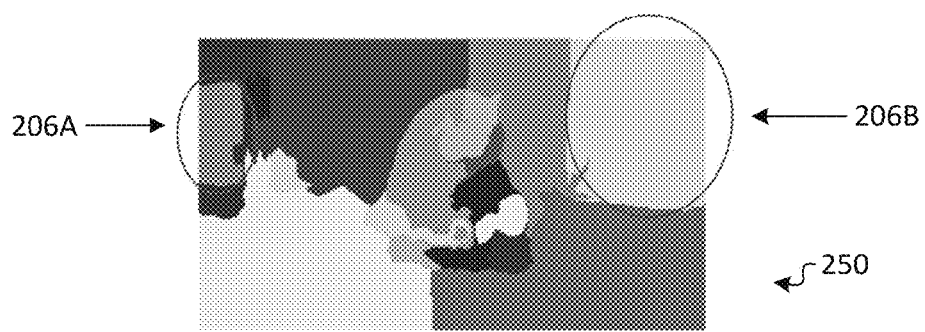
FIG. 2F illustrates an example of a modified image of a target image with merged superpixels according to one or more embodies disclosed herein.

FIG. 2F illustrates a modified image 250 of image 200 after merging superpixels. FIG. 2F illustrates merged regions 206A, 206B and other unlabeled merged regions. Each of these regions may be referred to as segments or merged superpixels. By continuously merging superpixels according a threshold value, unique planes within image 200 may be clearly identified. For example, region 206A may have a first orientation (i.e. planar structure) and region 206B may have a second orientation.

Figure 3:
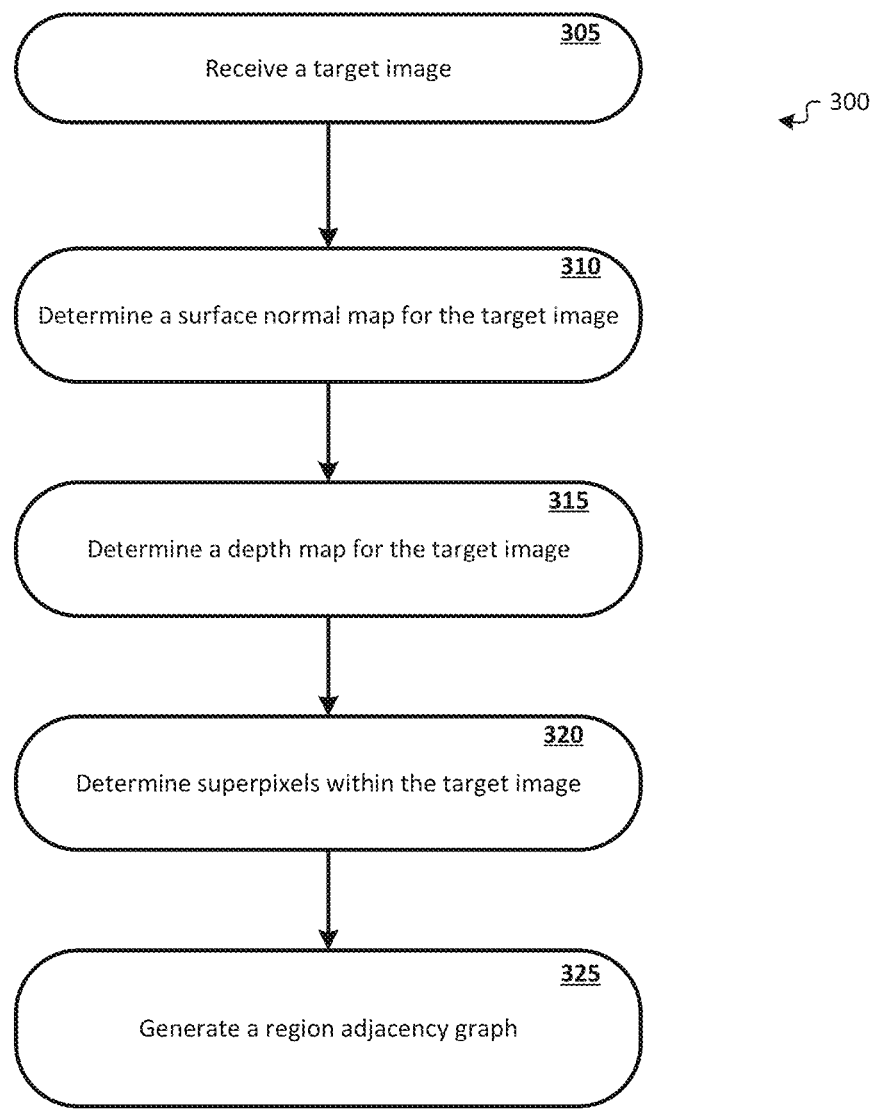
FIG. 3 illustrates an example of a process for a determining a region adjacency graph (RAG) according to one or more embodies disclosed herein.

FIG. 3 illustrates an example of a process 300 for determining a RAG graph for a 3D target image. At 305, a target image is received. A target image may be any image that is suitable to have one or more source images embedded (e.g., superimposed within one or more planar segments of the target image) in it. The target image may be a picture of a room, a building, an object, nature, and the like. In one embodiment the target image is a 3D or 2D image.

At, 310, a surface normal map is determined for the target image based upon a first process. The first process may be any process suitable to determine a normal value associated with each pixel the target image. In one embodiment, a CNN-based process is applied to the target image to determine a normal map. In one embodiment, the normal map is a colored normal map and may use the colors red, green, and blue to indicate x, y, and z coordinates of the target image. The CNN-based process also indicates the normal values for each pixel in the target image. In one embodiment, the CNN-based process may be trained on the NYU-Depth v2 database.

At 315, a depth map is determined for the target image based upon a second process. The second process may be any process suitable to determine a depth value associated with each pixel in the target image. In one embodiment, a CNN-based process is applied to the target image to determine a depth map. In one embodiment, the depth map is a colored depth map and different depths may be indicated by different colors or different shades of a color. The CNN-based process also indicates the depth values for each pixel in the target image. In one embodiment, the CNN-based process may be trained on the NYU-Depth v2 database.

At 320, superpixels are determined within the target image based upon a third process. The third process may be any process suitable to determine superpixels within the target image. In one embodiment, the third process is implemented by SLIC. SLIC is a method for generating superpixels by clustering pixels together based on their color similarity and proximity within the target image. Using the normal map (at 310) and the depth map (at 315) SLIC may be implemented to create a plurality of superpixels within the target image. In one embodiment, the third process may be implemented by a mean-shift image algorithm, a quick-shift algorithm, Watersheds algorithm, Turbopixels algorithm and the like.

At 325, a RAG is determined for the target image. The RAG may be created on top of the superpixels determined at 320. In the RAG, each node in the graph represents a superpixel. Each node in the RAG may be connected to another node by an edge. The edge may have an associated color value and brightness value. Edges with a higher brightness value may indicate a higher similar between adjacent superpixels than a lower brightness value. For example, an edge with yellow color with a high brightness value may indicate a very high similarity between nodes connected by the edge. In another example, an edge with a dark blue color and a low brightness value may indicate a very low similarity between nodes connected by the edge.

Figure 4:
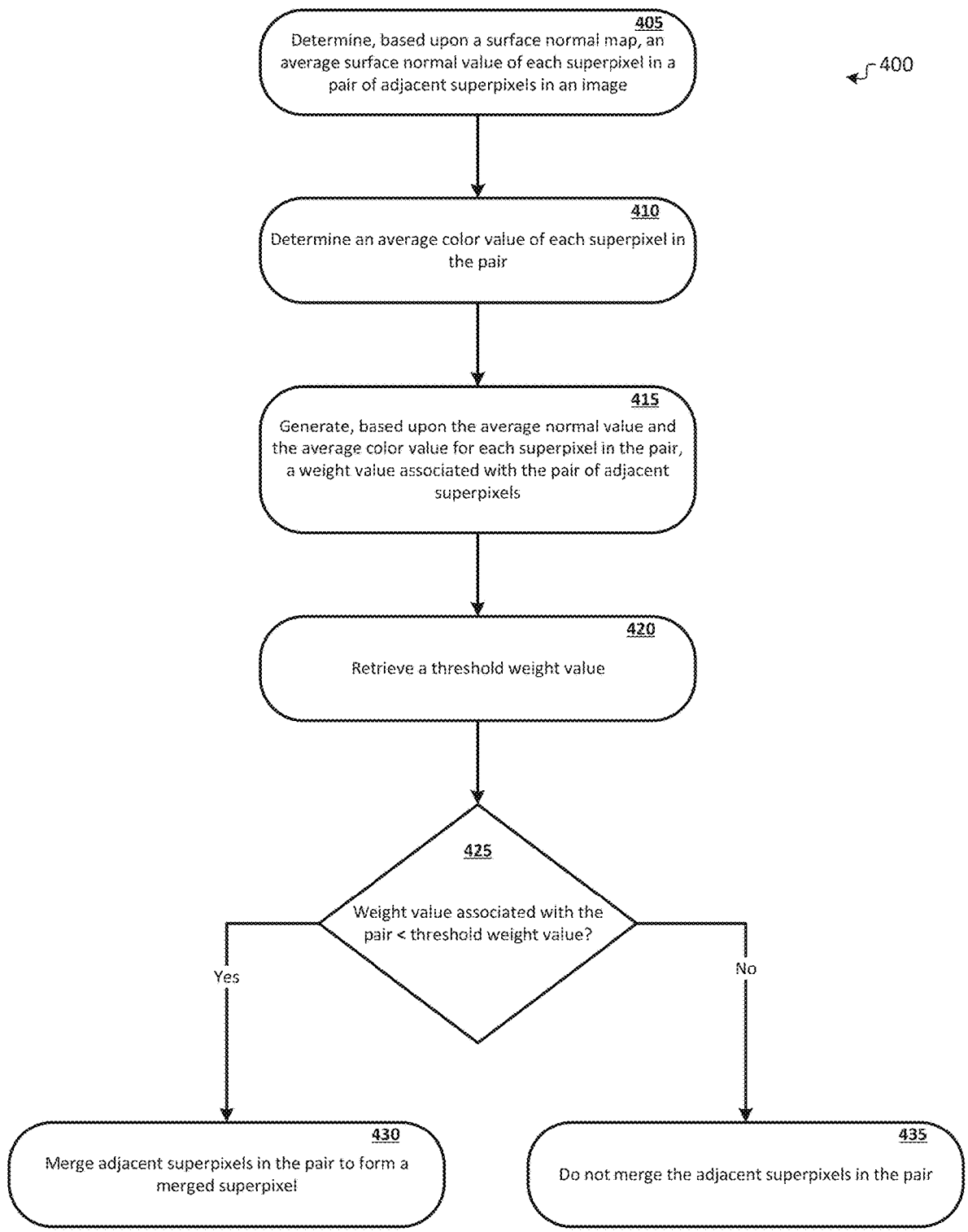
FIG. 4 illustrates an example of a process for merging superpixels to determine planar segments in an image based on a region adjacency graph of the image according to one or more embodies disclosed herein.

FIG. 4 illustrates an example of a process 400 for determining a plurality of merged superpixels based on a RAG. A RAG connects two adjacent superpixels (i.e., a pair of adjacent superpixels) via an edge. At 405, an average normal value of each superpixel in a pair of adjacent superpixels is determined based on normal values of each pixel in each superpixel. An average normal direction may be calculated for each superpixel in the RAG by first retrieving the normal values associated with each pixel in the respective superpixel. For example, normal values associated with each pixel in a target image may be determined at 310 of FIG. 3. After the normal values for each pixel in a superpixel are retrieved, an average normal direction is calculated for each superpixel. The normal value may indicate a vector that is perpendicular to a tangent plane to a particular surface within the target image. Thus, a normal may point to different directions based upon an underlying surface. By calculating an average of normals for a superpixel it may indicate the average direction (i.e. value) which a normal points to which may give information about the underlying surface associated with the superpixel. In one embodiment, the average normal direction may be a derived by adding together all normal values for each pixel in a superpixel and then dividing the total by the total number of pixels in a superpixel. The average normal direction may be determined for each superpixel in the RAG.

At 410, an average color value of a superpixel in a pair of adjacent superpixels is determined based on color values of each pixel in each superpixel. An average color value may be calculated for each superpixel in the RAG by first retrieving the color values associated with each pixel in the respective superpixel. A color value associated with each pixel may be determined at 310 and 315 of FIG. 3 by utilizing a colored surface map and/or a colored depth map. After the color values for each pixel in a superpixel are retrieved, an average color value is calculated for each superpixel. For example, a first color value may be associated with a pixel based upon a colored normal map. An example of a colored normal map is illustrated in FIG. 2B. A second color value may be associated with a pixel based upon a colored depth map. An example of a colored depth map is illustrated in FIG. 2C. These two color values may be mathematically combined to determine a total color value associated with a pixel. Each total color value for a pixel within a superpixel may be added together and then divided by the total number of pixels to determine the average color value of a respective superpixel. The average color value may be determined for each superpixel in the RAG.

At 415, a weight value associated with the pair of adjacent superpixels is generated based on an average normal value and an average color value. The weight between two superpixels may represent how similar the superpixels are to each other. The weight between two adjacent superpixel regions, i and j, is defined using the following formula:

$$w_{i,j} = \alpha e^{-|c_i - c_j|^2/\sigma 1} + (1-\alpha) e^{-|d_i - d_j|^2/\sigma 2},$$

where $w_{i,j}$ defines the weight of an edge between superpixels i and j. In addition, $c_i$ and $d_i$ define the average color value and average normal value of superpixel i, respectively. Similarly, $c_j$ and $d_{ij}$ define the average color value and average normal value of superpixel j, respectively. The average color value may be based upon a colored normal map and a colored depth map. Furthermore, $\alpha$ may be a constant value and $\alpha$ defines a similarity value that may govern how close to each other two colors should be. This may be chosen according to preference. A very large sigma may make any two colors behave as though they were similar. From this information a weight may be calculated for an edge connecting two adjacent superpixels in the RAG.

At 420, a threshold weight value is retrieved. The threshold weight value may be determined based upon preference and computing power.

At 425, a comparison is performed between the weight value of a pair of adjacent superpixels and the threshold weight value. If the weight value is below the threshold then at 430, the two adjacent superpixels are merged together to form a merged superpixel. If the weight value is above the threshold then at 435, a merger is not performed for the adjacent superpixels. In one embodiment, when the weight associated with two adjacent superpixels is above a threshold it indicates that two superpixels are not very similar to each other. On the other hand, when the weigh associated with two adjacent superpixels is below a threshold it may indicate that two superpixels are very similar.

In one embodiment one or more parts of process 400 may be repeated for merged superpixels. In such an embodiment, a merged superpixel may be treated as a superpixel. For example, a weight value between a pair of adjacent merged superpixel and a superpixel (or another merged superpixel) may be determined and if the weight value is below a threshold then the merged superpixel may merge with the superpixel (or the another merged superpixel). This process may be continued until no pair of adjacent merged superpixels or superpixels that have a weight below the weight threshold. By performing multiple iterations of process 400, unique planes within a background may be indicated based on the merger of superpixels. An example, of a result of performing multiple iterations of process 400 is shown in FIG. 2F, where different merged superpixels may be indicated by different colors in the target image.

Figure 5:
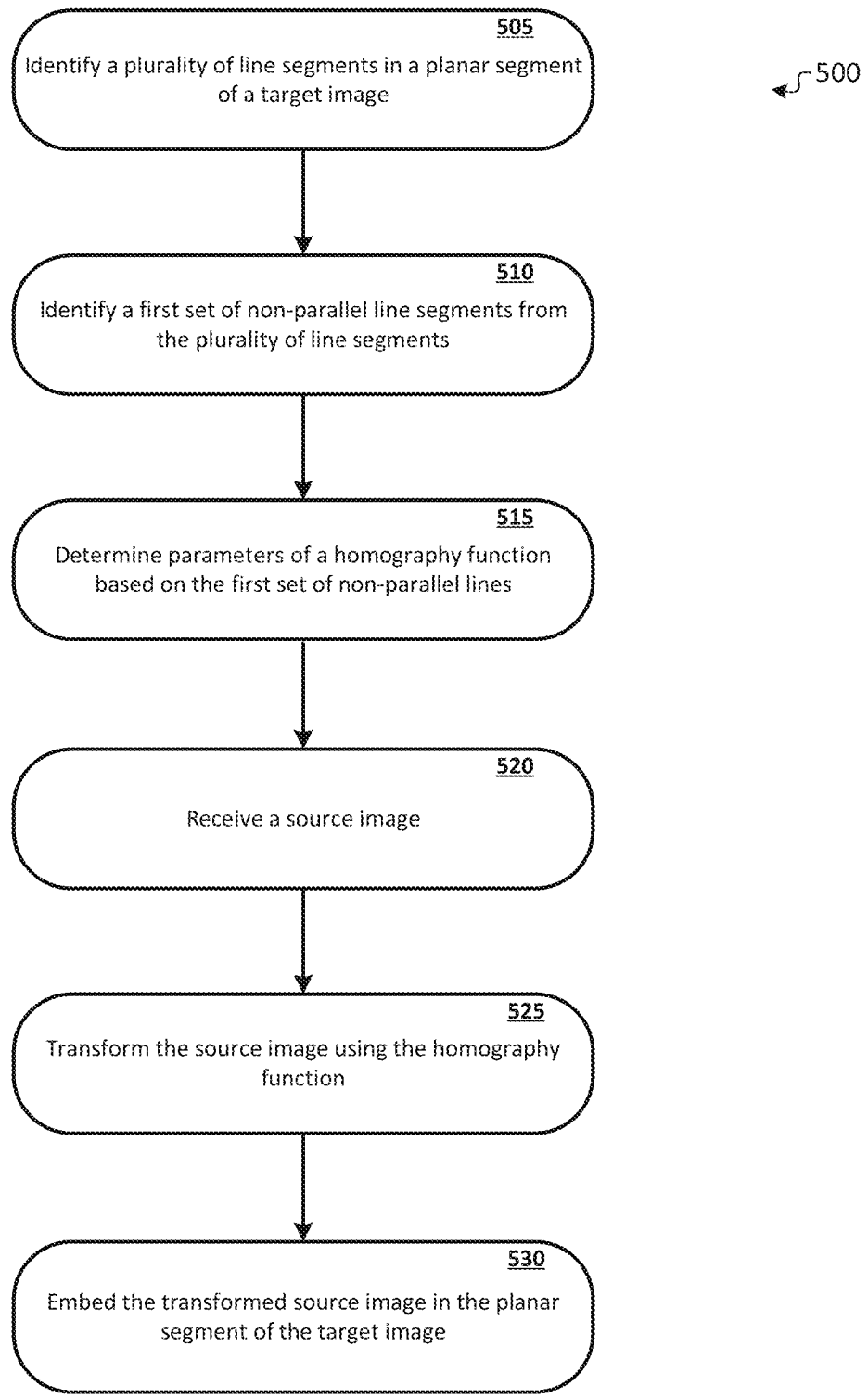
FIG. 5 illustrates an example of a process for determining a focal length for a homography function according to one or more embodies disclosed herein.
Figure 6:
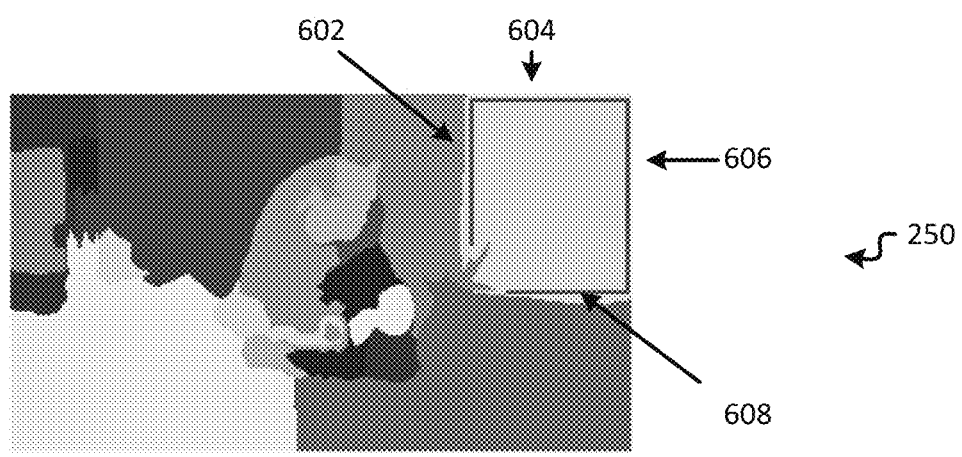
FIG. 6 illustrates an example of a modified target image with a plurality of line segments according to one or more embodies disclosed herein.

FIG. 5 illustrates an example of a process 500 for determining a focal length for a homography function. A focal length may serve as parameter for a homography matrix. The homography function may contain the homography matrix and the homography matrix may be applied to an image to transform the image to a different view with respect to a plane. At 505, a plurality of line segments in a planar segment of merged superpixel are identified. A target image may have several merged superpixels. Each merged superpixel in a target image may represent unique planes (i.e. unique planar segments) within the target image. An example of a target image with several merged superpixels is shown in FIG. 2F, where different merged superpixels may be indicated by different colors. Within the plurality of merged superpixels, a first merged superpixel may be selected. The first merged superpixel may be augmented with a graphic at the end of process 500. Once a first merged superpixel is selected, a plurality of lines segments within the merged superpixel may be selected. In one embodiment the line segments may correspond with a border of a merged superpixel. In one embodiment, the line segments may reside within the border of a merged superpixel. For example, turning briefly to FIG. 6, FIG. 6 illustrates an example of a modified image 250 of target image 200 with line segments 602-608. In the depicted embodiment, each line segment is associated with an edge of the superpixel. In one embodiment, the line segments may reside internal to the border of a merged superpixel.

At 510, a first set of line segments of the plurality of line segments are identified that are non-parallel. Once a plurality of line segments have been identified the plurality of line segments are reduced so that at least one set of non-parallel line segments (i.e. first plurality of line segments) is left. In one embodiment, the set of non-parallel line segments may also be required to intersect along reasonable extents of each line segment in the set of non-parallel line segments. In one embodiment, the conditions (i.e. being non-parallel and intersecting along reasonable extents) may be referred to as perpendicular-like conditions. Revisiting FIG. 6, based on the perpendicular-like conditions, line segments 604 and 608 could not be a pair because they are parallel. Similarly, line segment 602 and line segment 606 could not be a pair because they are also parallel. Line segments 602 and 608 could not be a pair because they do not intersect along reasonable extents. On the other hand, line segments 602 and 604 may be pair, line segments 604 and 606 may be pair, and line segments 606 and 608 may be pair. As noted earlier, line segments 602-608 are exemplary line segments and more line segments may exist. Line segments may exist in within a merged superpixel and not just on the border of a merged superpixel as shown in FIG. 6.

In one embodiment, other conditions may be implemented, instead of or in addition to, the perpendicular-like conditions. In such an embodiment, conditions may be selected based upon an expected underlying surface. For example, a perpendicular-like condition set may be chosen in instances where an underlying surface (e.g., the real world surface that is depicted in a photo) is a man-made structure or an emulation of a man-made structure. Man-made structures, such as walls typically are defined by straight perpendicular lines (e.g., rectangular shapes with corners). Because, this characteristic of a man-made structure is known, perpendicular-like lines may be searched for because that line structure matches the underlying surface structure. By the same notion, if an underlying surface structure was round, then circular-like lines may be searched for as a circular-line structure would match the underlying surface structure.

At 515, parameters of a homography function are determined. To determine parameters of a homography function, a homography function and an inverse homography function are identified. A homography function when applied to a source image from a front-parallel view transforms the source image from the front-parallel view to an orientation of a selected plane (i.e. a planar segment of the target image). An inverse homography function is the inverse of the homography function and when applied to the first set of non-parallel line segments in a selected plane transforms the first set of non-parallel from the orientation of the selected plane to two line segments that form a predetermined angle in a front-parallel view. Two line segments that form a predetermined angle may form one or more angles, such as, but not limited to a 30 degree angle, 50 degree angle, 90 degree angle and the like. The following equation may be used as a homography function:

$$H_{plane} = KRK^{-1} \text{ where } K = \begin{bmatrix} f_x & 0 & c_x \\ 0 & f_y & c_y \\ 0 & 0 & 1 \end{bmatrix}.$$

However, in this equation the focal length (i.e. $f_x$ and $f_y$) in matrix K are not known. $f_x$ may define a focal length with respect to a horizontal axis and $f_y$ may define a focal length with respect to a vertical axis. $c_x$ and $c_y$ are the normal values in with respect to the horizontal axis and the vertical axis, respectively. The normal values may be calculated by the same methodology that was used at 405 of FIG. 4 to calculate an average normal value of a merged superpixel, in which a plurality of normal values associated with pixels with a merged superpixel are considered. Since the average normal value is known the focal length value may need to be determined.

The inverse homography function is applied to the first set of non-parallel line segments to form a perpendicular line pair (i.e. two line segments that form a 90 degree angle) in a front-parallel view. Since it may be known known that an underlying surface has perpendicular features, it is possible to reverse engineer the focal length value based on an inverse homography function. In one embodiment, one or more sets of non-parallel line segments (from 510) may be selected. The selected sets of non-parallel line segments may also intersect along reasonable extents of each line segment. When a set of line segments meet both conditions (i.e. non-parallel and intersecting along reasonable extents) a set of non-parallel line segments may be referred to as perpendicular-like line segments. For example, line segments 606 and 608 of FIG. 6 may be utilized. These line segments when taken together are perpendicular-like line segments, but are not truly perpendicular because the planar segment (i.e. merged superpixel) where the lines exist may not be oriented in a front-parallel view. Thus, two line segments may appear to be perpendicular but are in actuality not perpendicular within the planar segment. In a first iteration, a focal length value (in the x-axis and y-axis directions) is estimated as an input into the inverse homography function (i.e., inverse $H_{plane}$). The inverse homography function is then applied to the perpendicular-like line segments to determine if the perpendicular-like line segments are transformed into perpendicular lines (or very close to perpendicular) in a front-parallel view. If the perpendicular-like line segments are perpendicular (or very close to perpendicular) in a front-parallel view, then the focal length value used for the inverse homography function is stored. On the other hand, if the perpendicular-like line segments are not perpendicular (or very close to perpendicular) in a front-parallel view, then another iteration is performed. In the second iteration, the focal length value is changed. As many iterations as necessary may be performed to determine the focal length value, that when input into an inverse homography function, transforms the perpendicular-like line segments from a first orientation to perpendicular lines (or very close to perpendicular) in a front-parallel orientation or view.

At 520, a source image is received. The source image may be an image that is to be superimposed (e.g., embedded) in the target image across one or more planes (i.e. one or more planar segments) within the target image.

At 525, the source image is transformed using the homography function. The previously determined focal length (from 515) may be input into the homography function. With the focal length known, all values for the homography function are known. The homography function may be applied to the source image to transform the source image from a front-parallel orientation (or view) to an orientation of the merged superpixel.

At 530, the transformed source image is embedded in one or more planar segments of the target image. Once the source image is transformed it may be embedded into one or more planar segments defined by one or more merged superpixels, such that the source image conforms to the geometry of the planes within the target image. As a result, conforming photorealistic augmentation in images and videos may be achieved.

Figure 7A:
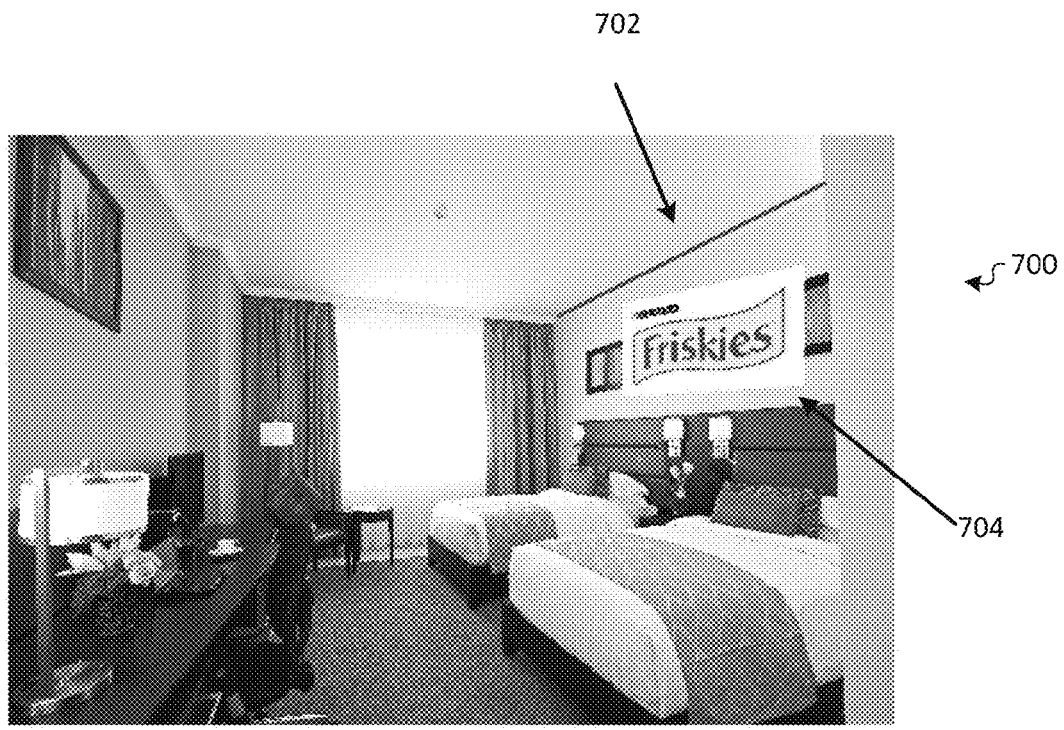
FIG. 7A illustrates an example of a non-photorealistic augmentation.
Figure 7B:
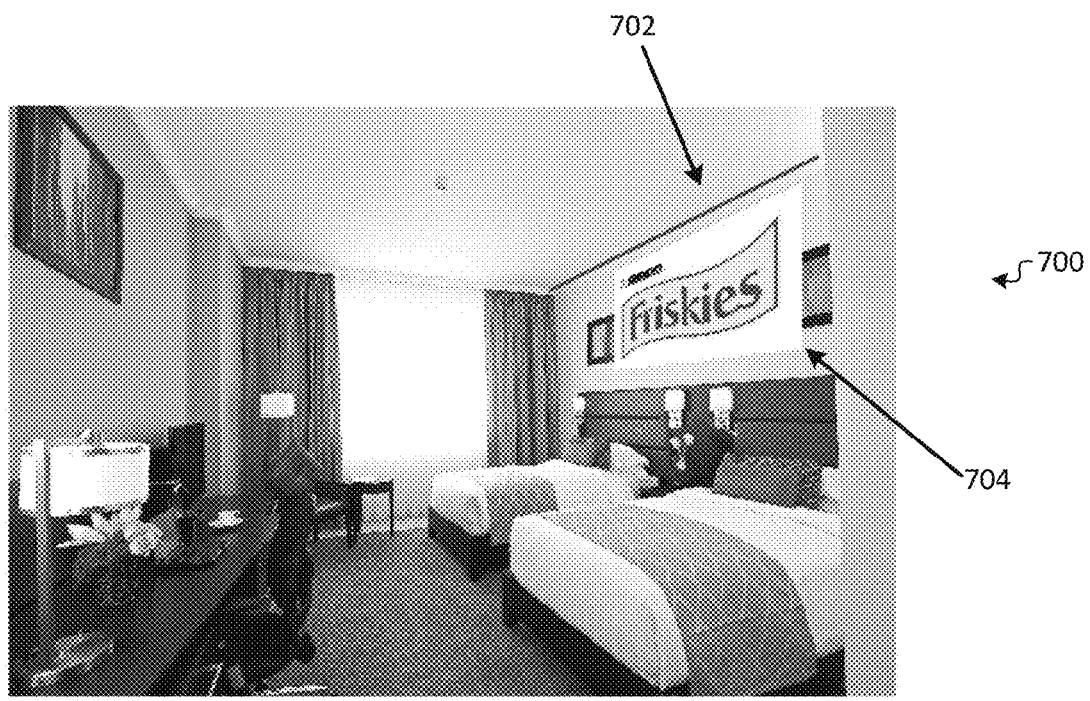
FIG. 7B illustrates an example of a photorealistic augmentation according to one or more embodies disclosed herein.

A result of the combination of processes 300, 400, and 500 is shown by an image 700 in FIG. 7B. Image 700 is a target image that comprises a plurality of different unique planes. For example, the ceiling may be one unique plane, the floor may be a unique plane, the left-most wall may be a unique plane, the top of the bed may be a unique plane, and the like. Line 702 identifies a line that is parallel to a unique plane in image 700. As a result of the combination of processes 300, 400, and 500, source image 704 is embedded in such a way that it conforms to a plane in image 700. In contrast, a result of not following one or more processes described herein (e.g., not merging superpixels and/or not accurately determining focal length) may result in a source image being embedded in the fashion as shown in FIG. 7A. In FIG. 7A, line 702 identifies a line that is parallel to a unique plane in image 700. Source image 704 is "embedded" in image 700, but does not conform to the geometry of the scene portrayed in image 700. By utilizing techniques described herein photorealistic augmentation of images and videos may be achieved.

Figure 8:
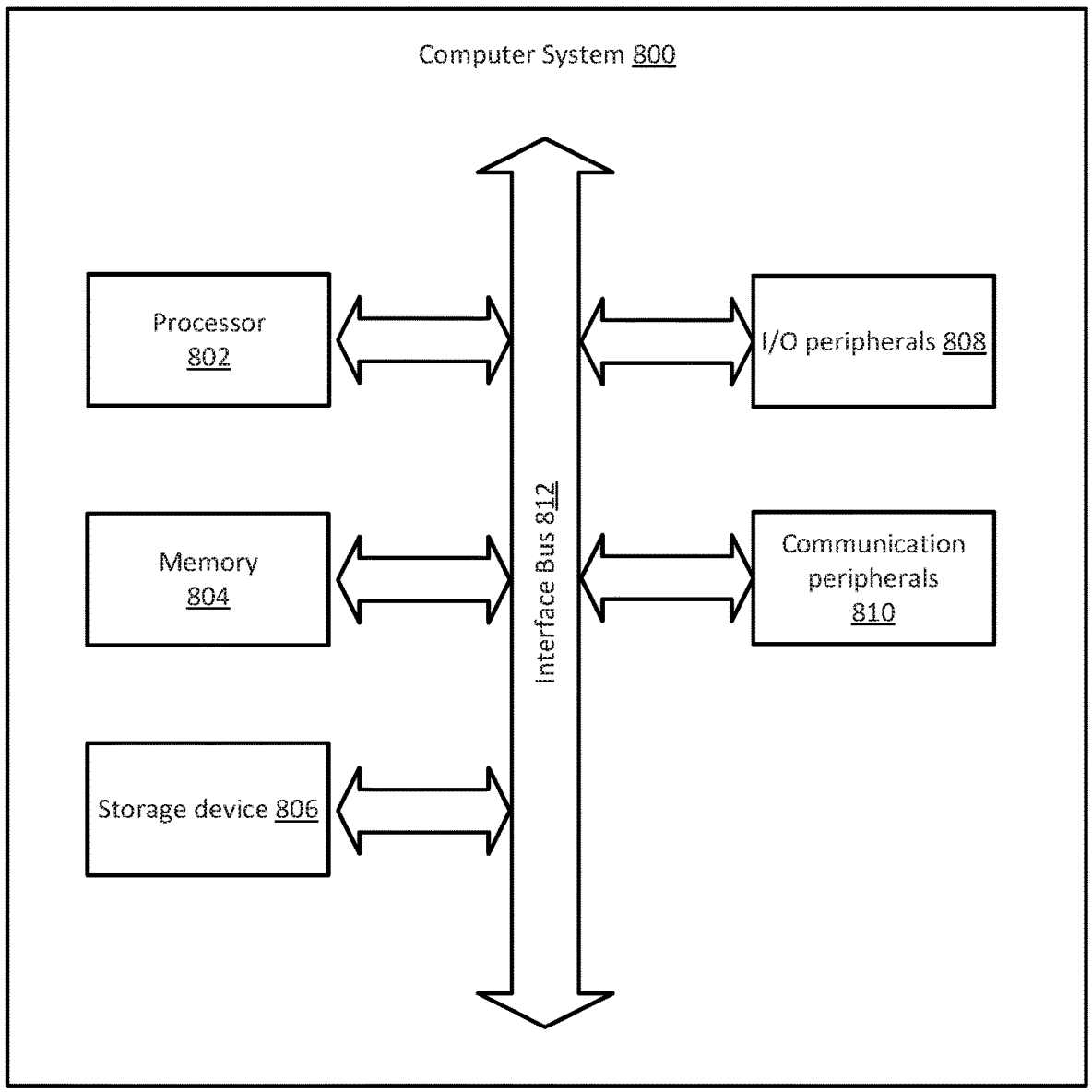
FIG. 8 illustrates an example of a computing system according to one or more embodies disclosed herein.

Any suitable computing system or group of computing systems can be used for performing the operations and processes described herein. For example, FIG. 8 depicts an example of the computing system 800. The implementation of computing system 800 could be used to perform one or more parts of processes 100, 300, 400, and 500 and embed a source image in a photorealistic manner into a target image.

The depicted example of a computing system 800 includes a processor 802 communicatively coupled to one or more memory devices 804. The processor 802 executes computer-executable program code stored in a memory device 804, accesses information stored in the memory device 804, or both. Examples of the processor 802 include a microprocessor, an application-specific integrated circuit ("ASIC"), a field-programmable gate array ("FPGA"), or any other suitable processing device. The processor 802 can include any number of processing devices, including a single processing device.

A memory device 804 includes any suitable non-transitory computer-readable medium for storing program code or program data. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

A storage device 806 includes additional store for computer system 800. In one embodiment, storage device 806 may be implemented by a hard drive disk and/or a steady state drive.

The computing system 800 may also include a number of external or internal devices, such as a monitor, keyboard, mouse, or other input or output devices. For example, computing system 800 is shown with one or more input/output ("I/O") peripheral 808. An I/O peripheral 808 can receive input from input devices or provide output to output devices. One or more buses 812 are also included in the computing system 800. The bus 812 communicatively couples one or more components of a respective one of the computing system 800.

The computing system 800 executes program code that configures the processor 802 to perform one or more of the operations described herein. Examples of the program code 805 include, in various embodiments, CNN-based algorithms executed to determine one or more maps related to a target image. The program code may be resident in the memory device 804 or any suitable computer-readable medium and may be executed by the processor 802 or any other suitable processor.

In some embodiments, one or more memory devices 804 store program data that includes one or more datasets and models described herein. Examples of these datasets include interaction data, experience metrics, input data for a machine learning algorithm or historical interaction data, transition importance data, etc. In some embodiments, one or more of data sets, models, and functions are stored in the same memory device (e.g., one of the memory devices 804). In additional or alternative embodiments, one or more of the programs, data sets, models, and functions described herein are stored in different memory devices 804 accessible via a data network.

In some embodiments, the computing system 800 also includes a network communications peripherals 810. The network communications peripherals 810 includes any device or group of devices suitable for establishing a wired or wireless data connection to one or more data networks. Non-limiting examples of the network communications peripherals 810 include an Ethernet network adapter, a modem, and/or the like. The computing system 800 is able to communicate with one or more other computing devices via a data network using network communications peripherals 810. For example, computing system 800 may receive one or more source images and/or target images via network communications peripherals 810.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computer-implemented method comprising, by one or more computing systems:
   identifying a planar region in a target image, wherein identifying the planar region in the target image comprises:
      determining a plurality of superpixels associated with the target image, each superpixel including a group of pixels;
      generating a weight value associated with each pair of adjacent superpixels among the plurality of superpixels in the target image, wherein the weight value is generated based on an average normal direction for each superpixel in the pair of adjacent superpixels and an average color value for each superpixel in the pair of adjacent superpixels;
      comparing the weight value associated with each pair of adjacent superpixels with a threshold weight value; and
      merging superpixels in each pair of adjacent superpixels that have the associated weight value being lower than the threshold weight value to form merged superpixels, wherein the planar region is identified by including the merged superpixels in the planar region;
   identifying a plurality of line segments for the planar region of the target image, wherein the plurality of line segments are not parallel;
   determining parameters for a homography function based on an inverse function of the homography function by determining that a predetermined angle is formed by two line segments in a front-parallel view, wherein the two line segments in the front-parallel view are generated by applying the inverse function of the homography function to at least two line segments from the plurality of line segments, wherein the predetermined angle is a non-zero angle;

obtaining a source image in the front-parallel view;
transforming the source image using the homography function; and
superimposing the transformed source image onto the planar region of the target image.

2. The computer-implemented method of claim 1, wherein the predetermined angle is a right angle.

3. The computer-implemented method of claim 1, wherein the parameters for the homography function comprise a camera focal length.

4. The computer-implemented method of claim 3, wherein determining the parameters for the homography function comprises:
setting an initial value for the camera focal length;
computing the inverse function of the homography function based at least in part on the initial value for the camera focal length;
transforming the planar region of the target image using the inverse function of the homography function;
determining an angle between the two line segments in the transformed planar region; and
determining an updated value for the camera focal length based on determining that the angle between the two line segments in the transformed planar region is different from the predetermined angle.

5. The computer-implemented method of claim 1, wherein determining the parameters for the homography function comprises determining a camera focal length of the target image using a neural network trained based on training images with known camera focal lengths.

6. The computer-implemented method of claim 1, wherein the plurality of line segments comprises intersecting line segments or line segments that intersect when extended by a distance less than a threshold distance.

7. The computer-implemented method of claim 6, wherein identifying the plurality of line segments for the planar region of the target image comprises:
detecting line segments in the planar region;
forming a set of line segment pairs based on the detected line segments; and
removing, from the set of line segment pairs, each line segment pair in which two line segments are parallel or do not intersect when extended by the threshold distance.

8. The computer-implemented method of claim 1, wherein an orientation of the planar region is distinct from the front-parallel view.

9. The computer-implemented method of claim 1, wherein identifying the planar region in the target image further comprises:
determining a surface normal map associated with the target image; and
generating a region adjacency graph associated with the plurality of superpixels, each superpixel represented by a node in the region adjacency graph, wherein
the weight value associated with each pair of adjacent superpixels is generated based at least in part upon the region adjacency graph and the surface normal map.

10. The computer-implemented method of claim 1, wherein determining the plurality of superpixels comprises applying simple linear iterative clustering (SLIC) on the target image.

11. The computer-implemented method of claim 9, wherein the weight value indicates a similarity between each pair of adjacent superpixels.

12. The computer-implemented method of claim 9, wherein
the average normal direction for each superpixel in the pair of adjacent superpixels is generated based, at least in part, upon the surface normal map associated with the target image.

13. The computer-implemented method of claim 12, wherein
the average color value for each superpixel in the pair of adjacent superpixels is determined based on color values of the group of pixels in each superpixel.

14. The computer-implemented method of claim 9, further comprising:
generating a weight value associated with each respective pair of adjacent merged superpixels;
comparing the weight value associated with each respective pair of adjacent merged superpixels with the threshold weight value; and
merging, for each pair of adjacent merged superpixels having the associated weight value lower than the threshold weight value, merged superpixels in the pair of adjacent merged superpixels to form a new merged superpixel.

15. The computer-implemented method of claim 1, wherein obtaining the source image in the front-parallel view comprises:
receiving an original source image in a view different from the front-parallel view; and
applying a second inverse homography function on the original source image to transform the original source image into the source image in the front-parallel view.

16. A system comprising:
a processing device; and
a non-transitory computer-readable medium communicatively coupled to the processing device, wherein the processing device is configured to execute program code stored in the non-transitory computer-readable medium and thereby perform operations comprising:
identifying a planar region in a target image, wherein identifying the planar region in the target image comprises:
determining a plurality of superpixels associated with the target image, each superpixel including a group of pixels;
generating a weight value associated with each pair of adjacent superpixels among the plurality of superpixels in the target image, wherein the weight value is generated based on an average normal direction for each superpixel in the pair of adjacent superpixels and an average color value for each superpixel in the pair of adjacent superpixels;
comparing the weight value associated with each pair of adjacent superpixels with a threshold weight value; and
merging superpixels in each pair of adjacent superpixels that have the associated weight value being lower than the threshold weight value to form merged superpixels, wherein the planar region is identified by including the merged superpixels in the planar region;
identifying a plurality of line segments for the planar region of the target image, wherein the plurality of line segments are not parallel;
determining parameters for a homography function based on an inverse function of the homography function by determining that a predetermined angle is formed by two line segments in a front-parallel view, wherein the two line segments in the front-parallel view are generated by applying the inverse function of the homography function to at least two line segments from the plurality of line segments, wherein the predetermined angle is a non-zero angle;

obtaining a source image in the front-parallel view;

transforming the source image using the homography function; and superimposing the transformed source image onto the planar region of the target image.

17. The system of claim 16, wherein the predetermined angle is a right angle.

18. The system of claim 16, wherein the parameters for the homography function comprise a camera focal length.

19. A non-transitory computer readable storage medium having executable instructions stored thereon, that, when executed by a computing device, cause the computing device to perform operations comprising:

identifying a planar region in a target image, wherein identifying the planar region in the target image comprises:

determining a plurality of superpixels associated with the target image, each superpixel including a group of pixels;

generating a weight value associated with each pair of adjacent superpixels among the plurality of superpixels in the target image, wherein the weight value is generated based on an average normal direction for each superpixel in the pair of adjacent superpixels and an average color value for each superpixel in the pair of adjacent superpixels;

comparing the weight value associated with each pair of adjacent superpixels with a threshold weight value; and merging superpixels in each pair of adjacent superpixels that have the associated weight value being lower than the threshold weight value to form merged superpixels, wherein the planar region is identified by including the merged superpixels in the planar region;

identifying a plurality of line segments for the planar region of the target image, wherein the plurality of line segments are not parallel;

determining parameters for a homography function based on an inverse function of the homography function by determining that a predetermined angle is formed by two line segments in a front-parallel view, wherein the two line segments in the front-parallel view are generated by applying the inverse function of the homography function to at least two line segments from the plurality of line segments, wherein the predetermined angle is a non-zero angle;

obtaining a source image in the front-parallel view;

transforming the source image using the homography function; and superimposing the transformed source image onto the planar region of the target image.

20. The non-transitory computer readable storage medium of claim 19, wherein the predetermined angle is a right angle.

* * * * *